United States Patent [19]

Burkin et al.

[11] 3,859,720

[45] Jan. 14, 1975

[54] METHOD OF MANUFACTURING MEMORY STACKS

[76] Inventors: Jury Alexandrovich Burkin, 29, kv. 24 Tsretroi proezd; Jury Emelyanovich Seleznev, 4-A, kv. 16. Vesenny proezd, both of Novosibirsk, U.S.S.R.

[22] Filed: Dec. 27, 1973

[21] Appl. No.: 428,860

[30] Foreign Application Priority Data

Dec. 27, 1972 U.S.S.R. .............................. 1869968

[52] U.S. Cl. .................... 29/604, 29/240.5, 29/424, 29/433, 29/456, 340/174 MA

[51] Int. Cl. .............................................. H01f 7/06

[58] Field of Search .. 29/604, 203 MM, 241, 240.5, 29/433, 456, 423, 424; 340/174 MA

[56] References Cited

UNITED STATES PATENTS

| | | | |
|---|---|---|---|
| 3,310,865 | 3/1967 | Schelling | 29/604 |
| 3,529,341 | 9/1970 | Bardo | 29/203 MM |
| 3,584,362 | 6/1971 | Hazel et al. | 29/203 MM |
| 3,594,897 | 7/1971 | Fulton | 29/604 |

*Primary Examiner*—C. W. Lanham
*Assistant Examiner*—Carl E. Hall
*Attorney, Agent, or Firm*—Holman & Stern

[57] ABSTRACT

A method for manufacturing memory stacks, whereby pole cores are strung in piles upon wires and the pole core piles thus formed are arranged in a row so as to be parallel and equidistant to one another, upon an adhesive elastic substrate. The substrate is then stretched, thus separating the pole cores in the piles from one another this operation is followed by threading the pole cores with a coiled wire and subsequently straightening the coiled wire, to produce a memory matrix row to be stacked in the memory stack being manufactured.

1 Claim, 2 Drawing Figures

METHOD OF MANUFACTURING MEMORY STACKS

BACKGROUND OF THE INVENTION

The present invention relates to techniques for manufacturing magnetic stores for electronic computers, control machines and special-purpose computers performing mathematical and logical operations and, more particularly, to a method for manufacturing memory stacks.

The invention is applicable to manufacturing magnetic stores, memory matrices and memory stacks of practically unlimited storage capacity, employing pole cores of different dimensions.

Various methods for manufacturing memory stacks are known in the art. One of these consists in that pole cores are strung on wires disposed in the first or "X" coordinate direction, whereupon these wires with pole cores strung thereon are spaced parallel and equidistantly in relation to one another in a row upon a frame, the total number of the thus strung wires depending upon the electrical parameters of the memory matrix which is stacked in the memory stack being manufactured.

Then one pole core is separated from each pile of pole cores, and the separated pole cores are arranged at an angle of 45° to the wires and perpendicular to one another. The pole cores are then threaded in the "Y" or second coordinate direction with a wire by means of a needle to the end of which the wire is secured. Thus one row of the memory matrix is formed. The remaining memory matrix rows are threaded in a similar manner.

The above method is extensively used in manufacturing memory stacks.

It has disadvantage, however, in that complications involved arise in arranging the pole cores in a row so they can be threaded with a wire in the second coordinate direction, provided the pole cores are placed at an angle to the direction of the movement of the needle. The possibility of damaging the pole cores and the insulation of the wires in both coordinate directions also arises. In addition, the above method does not provide for manufacturing a memory stack having subminiature pole cores.

The method described above is realized in a device having a frame, having wires mounted thereon in the first coordinate direction with pole cores strung thereon. The thus formed piles of the pole cores on each "X" wire are spaced equidistantly in a row, and parallel to one another. Arranged transversely to the wires of the first or "X" coordinate direction is pole core deflector made in the form of a pair of combs, the first comb preventing the pole core piles from sliding forward along the wires of the first coordinate direction, whereas the second comb, separated from the first comb by a spacer the height of which corresponds to that of the pole cores, separates one pole core from each pile of pole cores with its sharp edge. The first comb is then removed from the separated pole cores, and the latter slide downwards along the wires of the first coordinate direction. Mounted parallel to the deflector is a locating member formed of a pair of profiled toothed strips by means of which the pole cores are turned so as to assume a required position for threading in the "Y" or second coordinate direction with a wire by means of a needle to whose end the wire is secured.

At their joint, the profiled strips have a longitudinal groove which, provides a guide for the needle.

The above operations result in the formation of a memory matrix row which is stacked in the memory stack being manufactured.

Another method for manufacturing memory stacks, employs pole cores strung in piles on the wires of the first coordinate direction. These piles are spaced parallel and equidistantly to one another in a row. One pole core is separated from each pile, the separated pole cores being then placed perpendicularly to the wires of the first coordinate direction. The row of the separated pole cores is then threaded in the "Y" second coordinate direction with a coiled wire by simultaneously feeding and rotating the wire.

The coil in this case is preformed from the wire with which the pole cores are threaded in the second or "Y" coordinate direction, the coil having a pitch equal to the interval between the pole core piles. The wire of the second coordinate direction with the pole cores threaded therewith is then lowered along the wires of the first coordinate direction and straightened. Thus a memory matrix row is formed which is then stacked in the memory stack being manufactured.

The foregoing method for manufacturing memory stacks has the following disadvantages: multiple repetition of the operations of positioning and threading pole cores depending upon the number of rows in the memory matrix; complications involved in separating and positioning the pole cores, those of especially small-size; and, finally, relatively low efficiency due to the impossibility of simultaneously manufacturing several rows of a memory matrix.

The above method for manufacturing memory stacks in realized with the aid of a device, wherein the wires of the first or "X" coordinate direction having pole cores pre-strung in piles thereon, are mounted on a frame. The pole core piles are spaced parallel and equidistantly to one another in a row. A feed-control attachment made in the form of a roller having at least one longitudinal groove is also mounted on the frame, in order to separate one pole core from each row of pole cores and position the separated pole cores in a row, perpendicularly to the wires of the first or "X" coordinate direction. On one side there of the feed-control attachment is enveloped by the wires of the first coordinate direction with pole cores strung in piles thereon. Installed on one end face side of the feed-control attachment is a soil-forming mechanism to coil the wire with which the pole cores are threaded in the second coordinate direction. An auxilliary roller is mounted parallel to the feed-control attachment for touching the coil and having on its surface annular grooves spaced at an interval equal to the pitch of the coil. The auxiliary roller is positioned so that the grooves are displaced in relation to the centers of the pole cores arranged upon the feed-control attachment by a value determined by the angle of pitch of the coil. The auxiliary roller is set into rotation by a drive. The coil-forming mechanism is made in the form of a cone-shaped spindle arranged between a pair of threading dies. This mechanism performs the function of threading the row of pole cores with the coiled wire in the second or "Y" coordinate direction. By straightening the wire with which the pole cores have been threaded in the second coordinate direction, one memory matrix row is formed, which is then stacked in the memory stack being manufactured.

SUMMARY OF THE INVENTION

It is an object of the present invention to provide a method for manufacturing memory stacks, which is simple and convenient at the present stage of technological development and makes it possible to manufacture memory stacks with different storage capacities and different circuitries.

In view of these and other objects, the invention essentially resides in providing a method for manufacturing memory stacks, whereby pole cores are strung in piles on the wires of the first or "Y" coordinate direction, the piles then being spaced parallel and equidistantly to one another in a row, and the pole cores being threaded in the second or "Y" coordinate direction with a coiled wire. The coiled wire is then straightened, thus forming a memory matrix row which is stacked in the memory stack being manufactured, the method being characterized, in accordance with the present invention, in that after being spaced parallel and equidistantly to one another, the pole cores are mounted on an elastic substrate, at least one of the surfaces of said substrate being adhesive, by pressing the pole cores against the adhesive surface of the elastic substrate. The elastic substrate is then stretched along the wires of the first coordinate direction, thus separating the pole cores in the piles from one another with the result that the pole cores are arranged upon the elastic substrate in parallel rows in the first or "X" coordinate direction intersecting other parallel rows of the second or "X" coordinate direction formed by the same cores.

BRIEF DESCRIPTION OF THE DRAWINGS

Other objects and advantages of the present invention will become more apparent from the following description of specific embodiments thereof taken in conjunction with the accompanying drawings, wherein.

DETAILED DESCRIPTION OF PREFERRED EMBODIMENTS

The proposed method for manufacturing memory stacks is as follows.

Figure 1:
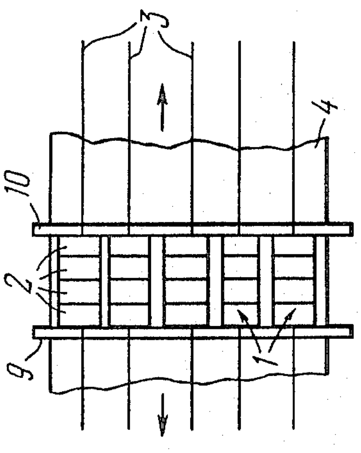
FIG. 1 illustrates the operation of mounting pole core piles on an elastic substrate, in accordance with the invention.
Figure 2:
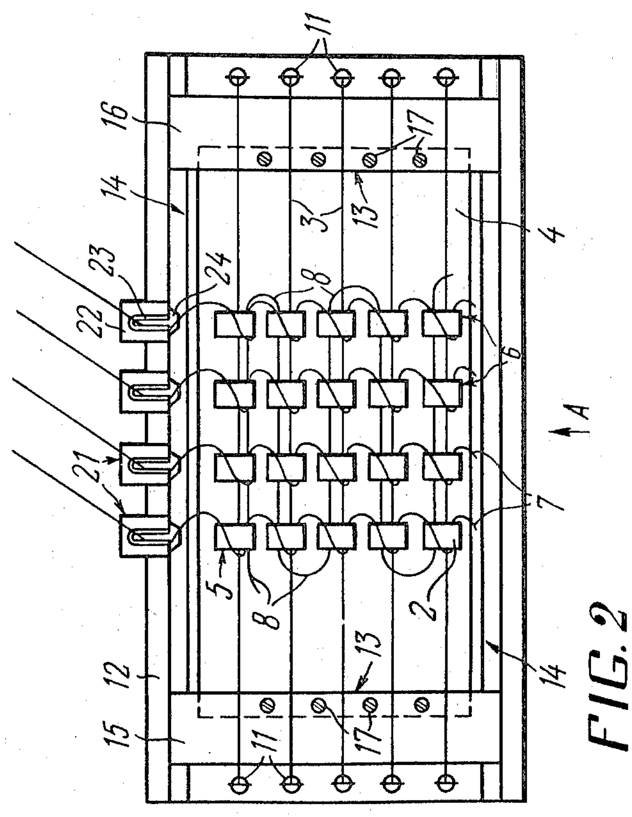
FIG. 2 illustrates the operation of stretching the elastic substrate and that of threading the pole cores arranged thereon in the second coordinate direction with a coiled wire, in accordance with the invention.

Pole cores 2 are strung, automatically or manually, in piles 1 (FIG. 1) upon wires 3 of the first or "X" coordinate direction, after which the pole cores 2 in the piles 1 are firmly pressed against one another. The piles 1 of pole cores 2 are arranged in a row, parallel and equidistant to one another, above an elastic substrate 4, at least one of the surfaces of the substrate being adhesive. By pressing the piles 1 against the adhesive surface of the elastic substrate 4, or to one of the adhesive surfaces thereof, the pole core 2 is secured with its lateral side to the adhesive surface. The elastic substrate 4 is then stretched along the wires 3 of the first coordinate direction, as shown by the arrows, thus separating the pole cores 2 in the piles 1 from one another and spacing them at a distance corresponding to the arrangement of the pole cores in a finished matrix. As a result, the pole cores 2 are positioned and fixed on the elastic substrate 4 in parallel rows 5 (FIG. 2) of the first coordinate direction intersecting other parallel rows 6 of the second coordinate direction formed by the same pole cores 2. The, pole cores 2 are then threaded in the second coordinate direction with a coiled wire 7 or with several coiled wires 7 simultaneously, as shown in FIG. 2. Following the threading with the wires 3 and 7 of the first and second coordinate directions, respectively, of the pole cores 2, the latter pole cores are removed from the elastic substrate 4, and the coiled wires 7 are straightened, thus forming memory matrix rows.

In this manner, the required number of matrices is produced. Each memory matrix is manually threaded with a readout wire 8. Memory matrices produced in the above manner are used to make up a memory stack.

The foregoing method for manufacturing memory stacks is realized in a device described hereinbelow.

Figure 3:
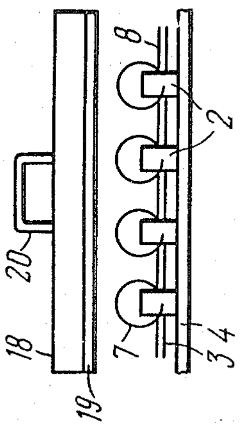
FIG. 3 is a view taken along line A of a stretched elastic substrate with pole cores mounted thereon, in accordance with the invention.

The wires 3 (FIG. 1) of the first or "X" coordinate direction are arranged in a row, parallel and equidistantly to one another. Prior to this arrangement, pole cores 2 are strung in piles 1, automatically, or manually, on the wires 3 disposed in the first or "X" coordinate direction. The piles 1 of the pole cores 2 on the wires 3 of the first coordinate direction are arranged in a row, wherein they are parallel and equidistant to one another. The pole cores 2 in the piles 2 are then firmly pressed against one another with the aid of removable flat strips 9 and 10, the latter operation being done manually. The elastic substrate 4 is made from an elastic band, for example, from vulcanized rubber having an adhesive layer on at least one side thereof, for instance, of uncured rubber. After the pole cores 2 have been strung on the wires 3, the ends of these wires are secured in clamps 11 (FIG. 2) mounted on a frame 12 of the device. The elastic substrate 4 is positioned in such a way that it is in contact with the working surface of the frame 12 and is secured at its ends in grooves 13 of a stationary carriage 15 and a movable carriage 16 mounted on the frame 12 in two guiding grooves 14 with the aid of screws 17. The piles 1 (FIG. 1) of the pole cores 2 arranged in immediate proximity to and above the elastic substrate 4 are simultaneously pressed against the adhesive layer thereof by a removable flat lid 18 (FIG. 3), applied to one side thereof, facing the piles 1 of the pole cores 2, is an energy absorbing material 19, for example, rubber. The lid 18 is provided with a handle 20. The elastic substrate 4 is stretched by moving the carriage 16 (FIG. 2) along the wires 3 of the first coordinate direction, thus separating the pole cores 2 from one another. The pole cores 2 are thus arranged upon the elastic substrate 4 in parallel rows 5 of the first coordinate direction, intersecting with the other parallel rows 6 of the second or "Y" coordinate direction, formed by the same pole cores 2. Each row 6 of the pole cores 2 is then threaded, with the aid of a coil-forming mechanism 21 mounted on the frame 12 and in the second coordinate direction, with the coiled wire 7 by screwing the coil into the holes of the pole cores 2. This method also makes it possible to thread the pole cores 2 in the second coordinate direction by several coil-forming mechanisms 21 simultaneously, which is shown in FIG. 2. Each of the coil-forming mechanisms 21 has a casing 22 with threading dies 23, arranged in said casing is a rotary cone-shaped spindle 24. The number of coil-forming mechanisms 21 is equal to that of the memory matrix rows of the second coordinate direction. Following the threading of the poles cores 2 in the second coordinate direction, the wires 3 of the first coordinate direction are released from the clamps 11, and the coiled wires 7 are released from the coil-forming mechanisms 21. The coiled wires 7 are then straightened. As a result, a memory matrix is formed. The pole cores 2 of this matrix are threaded manually with the readout wire 8. Finished matrices are placed one upon another, thus making up a memory stack.

The proposed method for manufacturing memory stacks simplifies the operations of separating and positioning pole cores; performs simultaneous separation of all pole cores and arranging them in rows; and performs simultaneous threading of all pole cores of a memory stack in the second coordinate direction.

We claim:

1. A method for manufacturing memory stacks, comprising the steps of: stringing a plurality of pole cores upon each of a plurality of wires, said wires extending in a first or "X" coordinate direction disposed on a frame and the cores on each of the wires forming piles; arranging the piles in a row, wherein they are parallel and equidistant to one another; mounting the thus arranged row upon an elastic substrate having at least one adhesive surface, by pressing the row against the adhesive surface; stretching the elastic substrate in a direction parallel to said first coordinate direction, thus separating the pole cores in the piles from one another so that pole cores are arranged upon the elastic substrate in parallel rows of the first or "X" coordinate direction intersecting with other parallel rows of a second or "Y" coordinate direction formed by the same pole cores; threading the pole cores in the second coordinate direction with a coiled wire, whereby a memory matrix row is produced to be stacked in the memory stack being manufactured.

* * * * *